(12) United States Patent
Liu

(10) Patent No.: US 7,458,563 B1
(45) Date of Patent: Dec. 2, 2008

(54) TREE STAND HOIST

(76) Inventor: Ssu-Liu Liu, 2F., No. 44, Lane 11, Kuang Fu N. Rd., Taipei (TW)

( * ) Notice: Subject to any disclaimer, the term of this patent is extended or adjusted under 35 U.S.C. 154(b) by 495 days.

(21) Appl. No.: 11/338,663

(22) Filed: Jan. 25, 2006

(51) Int. Cl.
*B66D 1/36* (2006.01)

(52) U.S. Cl. .................... 254/334; 254/335; 254/337; 254/342; 254/376; 254/380

(58) Field of Classification Search .............. 254/329, 254/334, 335, 337, 342, 357, 376, 380
See application file for complete search history.

(56) References Cited

U.S. PATENT DOCUMENTS

| | | | | | |
|---|---|---|---|---|---|
| 484,042 | A * | 10/1892 | Murphy et al. | ............... | 182/240 |
| 3,165,297 | A * | 1/1965 | Thompson, III et al. | .... | 254/344 |
| 4,290,584 | A * | 9/1981 | Eckels et al. | ................. | 254/380 |
| 4,314,693 | A * | 2/1982 | Hobbs | ........................ | 254/376 |
| 5,484,253 | A * | 1/1996 | Johnson | ...................... | 414/787 |
| 5,562,534 | A * | 10/1996 | McGough | ................... | 452/187 |
| 5,607,143 | A * | 3/1997 | Regal | .......................... | 254/342 |
| 5,971,363 | A * | 10/1999 | Good | .......................... | 254/323 |
| 6,045,442 | A * | 4/2000 | Bounds | ....................... | 452/187 |
| 6,238,171 | B1 * | 5/2001 | Carter | ......................... | 414/563 |
| 6,578,823 | B1 * | 6/2003 | Johnson | ....................... | 254/334 |
| 6,739,964 | B2 * | 5/2004 | Gearhart | ...................... | 452/187 |
| 7,007,927 | B2 * | 3/2006 | Halas | .......................... | 254/225 |
| 7,191,732 | B2 * | 3/2007 | Neal, Jr. | ................... | 119/57.91 |
| 7,226,040 | B2 * | 6/2007 | Keister | ........................ | 254/324 |
| 7,314,406 | B2 * | 1/2008 | Bilinovich | ................... | 452/185 |

\* cited by examiner

*Primary Examiner*—Emmanuel M Marcelo
(74) *Attorney, Agent, or Firm*—Troxell Law Office, PLLC

(57) ABSTRACT

A tree stand hoist includes a holder frame with stop bars and harnesses for fastening to a tree, a bracket provided at the back side of the holder frame to support a cable wheel, a cable pulley assembly provided with a rope for fastening to the tree at a high place, a steel cable, which has one end fastened to the cable wheel and the other end inserted through the cable pulley assembly and terminating in a hook for hooking a tree stand, and a crank handle for rotating the cable wheel through a gear transmission mechanism to roll up the steel cable so as to lift the tree stand for setting up on the tree.

7 Claims, 9 Drawing Sheets

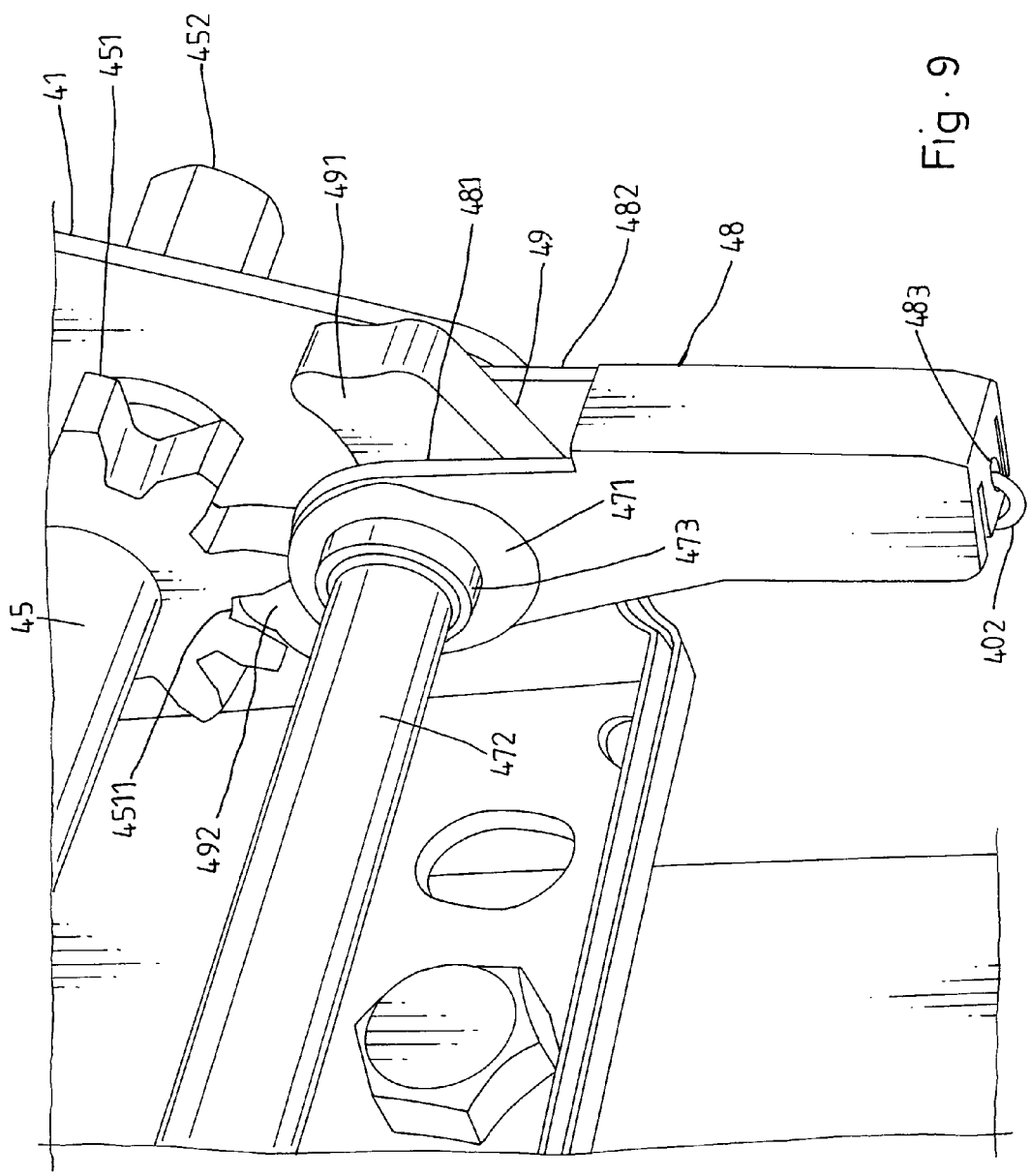

TREE STAND HOIST

BACKGROUND AND SUMMARY OF THE INVENTION

The present invention relates to a tree stand installation apparatus and more particularly, to a tree stand hoist, which is safe and practical in use to lift a tree stand rapidly with less effort for setting up on a tree.

Hunting is a sports activity of many people's favorite. When hunting a deer, the hunter must shoot a small area around the heat of the deer. In order to kill the animal with one single shot, it takes much time to waist for the best shooting angle. When going to hunt deer or other big animals, it is necessary to carry camping equipment and a tree stand 91 (see FIG. 1). When selected the camping place, the tree stand 91 is set up on a tree 92 at a suitable height, and then the hunter keeps sitting on the tree stand 91 to wait for the hunt. However, because the tree stand 91 has a certain weight (more than 20 kgs) and its top is relatively heavier than its foot, it is difficult to set up the tree stand 91 on the selected tree 92. Further, it requires 2 or 3 persons to set up the tree stand 91. The tree stand 91 may collapse accidentally during operation, thereby resulting in an accident.

The present invention has been accomplished under the circumstances in view. It is one object of the present invention to provide a tree stand hoist, which can conveniently be operated by one single person to lift a tree stand for setting up on a tree rapidly with less effort. It is another object of the present invention to provide a tree stand hoist, which is safe in use. To achieve these and other objects of the present invention, the tree stand hoist comprises a holder frame, which comprises a vertical main shaft, a plurality of horizontal stop bars respectively and fixedly provided at the front side of the vertical main shaft near the top and bottom ends, and a plurality of belt lugs respectively provided at the vertical main shaft near the horizontal stop bars, two harnesses, which are respectively mounted on the belt lugs of the holder frame and adapted to fasten the holder frame to a tree, a bracket, which is fixedly fastened to the back side of the vertical main shaft and has two parallel sidewalls, a cable wheel, which is pivotally supported between the two parallel sidewalls of the bracket, a driven gear wheel, which is fixedly fastened to one side of the cable wheel, a cable pulley assembly, a rope, which is provided for fastening to the trunk of a tree and has one end fastened to the cable pulley assembly, a steel cable, which has a first end fixedly fastened to the periphery of the steel cable and a second end inserted through the cable pulley assembly and fixedly provided with a hook for hooking a tree stand, an axle, which is pivotally supported on the two parallel sidewalls of the bracket and has a coupling tip extended from one end thereof, a transmission gear, which is fixedly mounted on the axle and meshed with the driven gear wheel, and a crank handle, which is coupled to the coupling tip of the axle for rotating the axle.

BRIEF DESCRIPTION OF THE DRAWING

FIG. 9 corresponds to FIG. 8, showing the second tooth of the ratchet block meshed with the transmission gear.

DETAILED DESCRIPTION OF THE INVENTION

Figure 1:
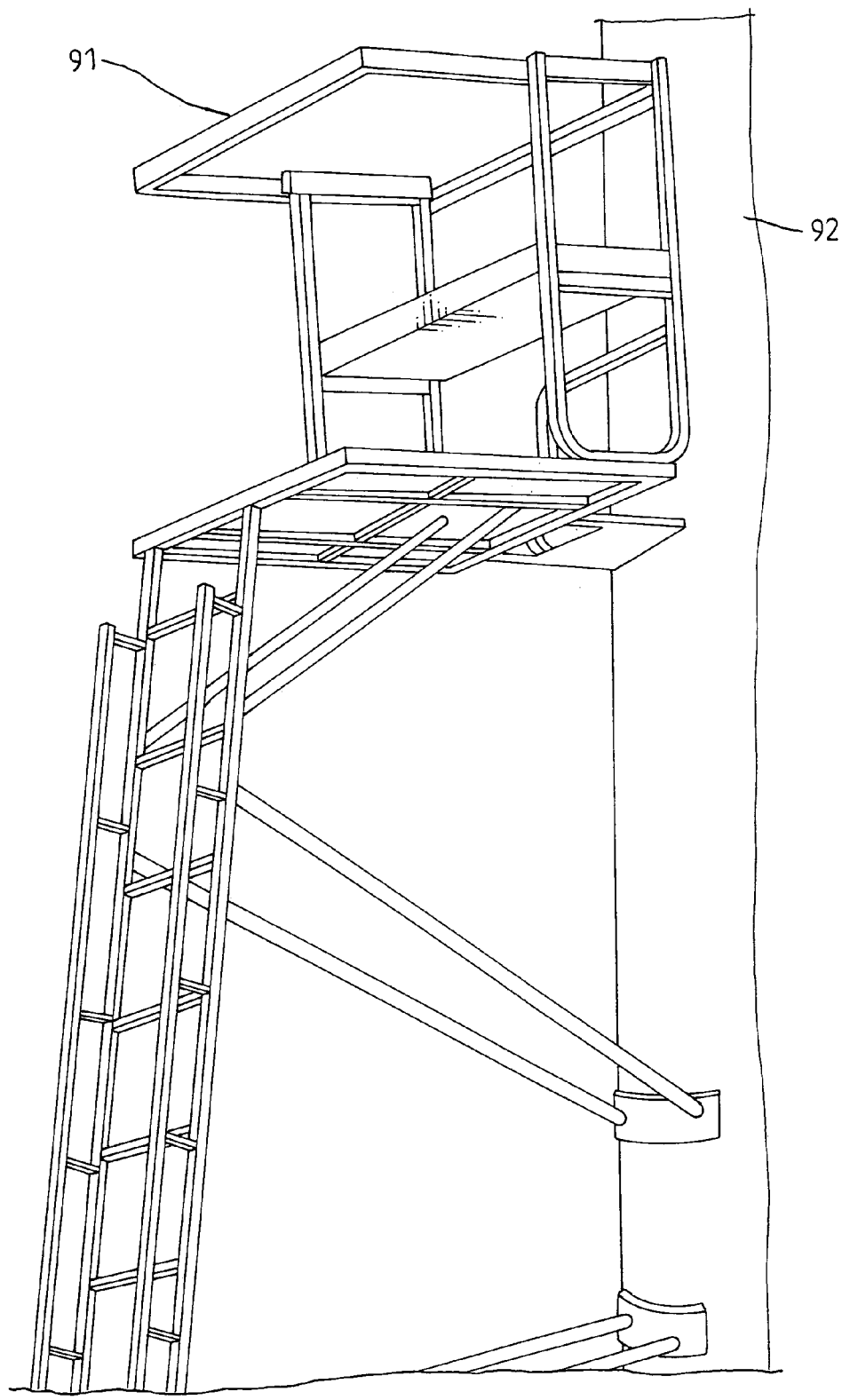
FIG. 1 is a schematic drawing showing a tree stand set up on a tree according to the prior art.
Figure 2:
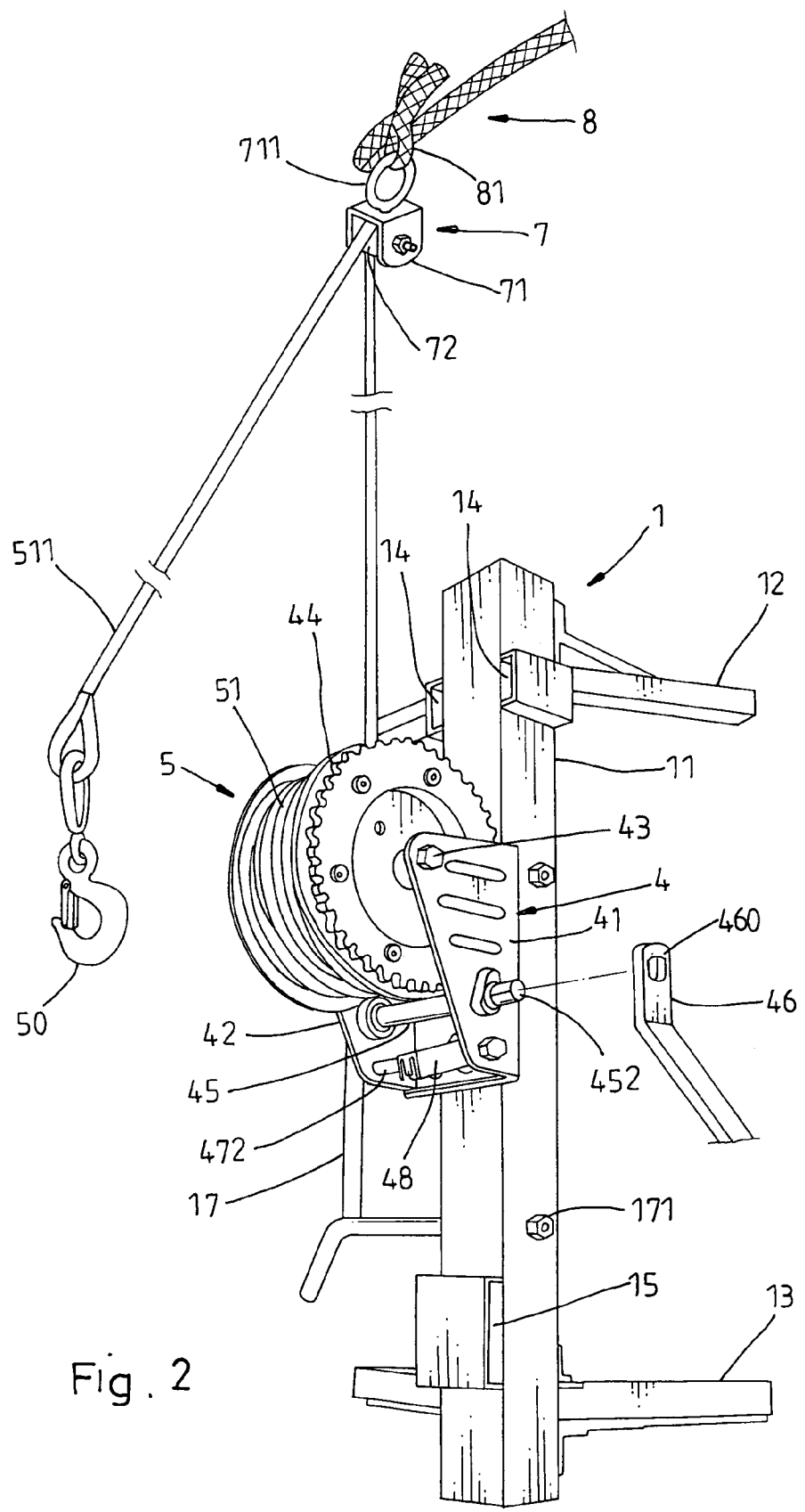
FIG. 2 is a perspective view of a tress stand hoist according to the present invention (before mounting of the harnesses).
Figure 3:
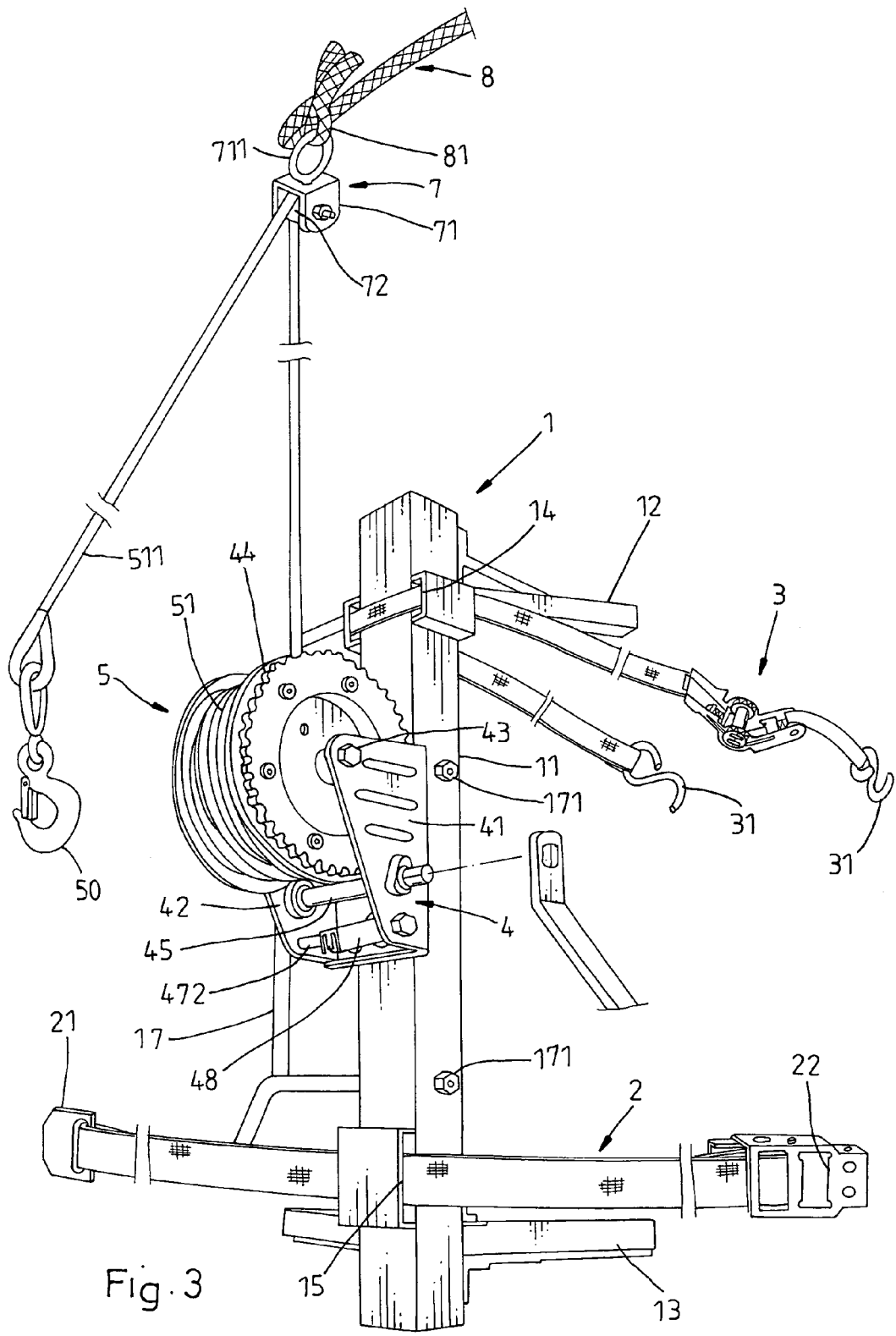
FIG. 3 is a perspective view of a tress stand hoist according to the present invention (after mounting of the harnesses).
Figure 4:
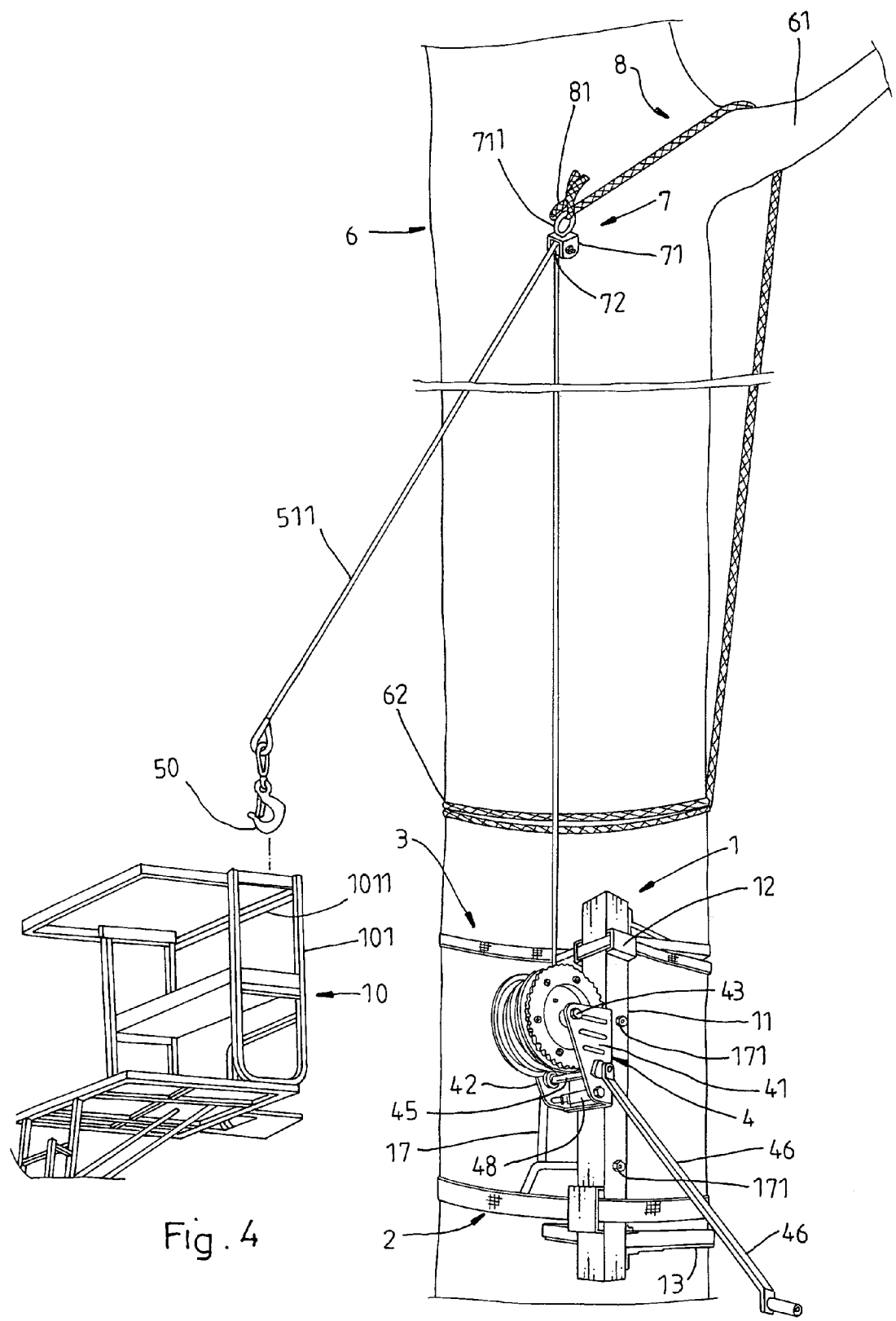
FIG. 4 is a schematic drawing showing an application example of the present invention.
Figure 5:
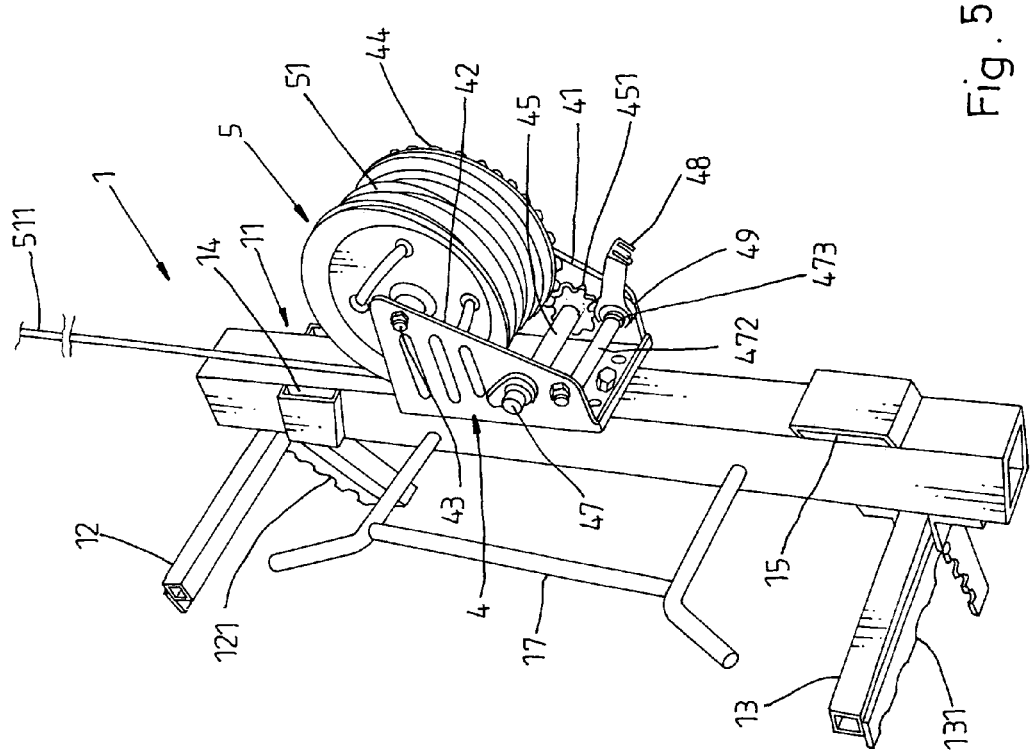
FIG. 5 is another perspective view of the tree stand hoist according to the present invention when viewed from another angle.

Referring to FIGS. 2~9, a tree stand hoist in accordance with the present invention is adapted to lift/lower a tree stand 10 for enabling the tree stand 10 to be installed in or removed from a tree 6 (see FIG. 4). The tree stand hoist comprises a metal holder frame 1. The holder frame 1 comprises a vertical main shaft 11 and a plurality of horizontal stop bars 12 and 13 respectively and fixedly provided at the front side of the vertical main shaft 11 near the top and bottom ends. The vertical main shaft 11 has upper and lower belt lugs 14 and 15 respectively disposed near the horizontal stop bars 12 and 13. Two harnesses 2 and 3 are respectively mounted on the belt lugs 14 and 15 and adapted to fasten the holder frame 1 to the tree 6. Further, a bracket 4 is fixedly fastened to the back side of the vertical main shaft 11 with fastening members 16 at a suitable location between the upper and lower belt lugs 14 and 15. Alternatively, the bracket 4 can be directly welded to the vertical main shaft 11. The bracket 4 has two parallel sidewalls 41 and 42. A cable wheel 5 is pivotally supported between the two parallel sidewalls 41 and 42 by a pivot 43, having wound thereon a steel cable 51. A driven gear wheel 44 is fixedly provided at one side of the cable wheel 5. An axle 45 is pivotally supported on the two parallel sidewalls 41 and 42 in parallel to the pivot 43. A transmission gear 451 is fixedly mounted on the axle 45 and meshed with the driven gear wheel 44 (see FIG. 8). The axle 45 has a coupling tip 452 extending out of one sidewall 41 and coupled to a crank handle 46. The crank handle 46 has a coupling hole 460 disposed at one end and coupled to the coupling tip 452 of the axle 45. The aforesaid steel cable 51 has one end (not shown) fixedly connected to the periphery of the cable wheel 5, and the other end 511 provided with a hook 50. Further, a cable pulley assembly 7 is coupled to the steel cable 51, and fastened to one end 81 of a rope 8.

When in use, the horizontal stop bars 12 and 13 of the holder frame 1 are attached to the tree 6 at a location about equal to the height of a person (see FIG. 4), and then the harnesses 2 and 3 are respectively fastened to the tree 6, and then the rope 8 is extended upwards over a branch 61 of the tree 6 and then fastened to the trunk 62 of the tree 6 below the branch 61, and then the hook 50 at one end 511 of the steel cable 5 is hooked on one horizontal top frame bar 1011 of the top rack 101 of the tree stand 10, and then the crank handle 46 is operated to rotate the axle 45 in one direction, causing the transmission gear 451 to rotate the driven gear wheel 44 and the cable wheel 5 to roll up the steel cable 51, and therefore the tree stand 10 is lifted to the desired elevation for setting up on the tree 6. On the contrary, when rotating the crank handle 46 in the reversed direction after dismounting of the tree stand 10 from the branch 61 of the tree 6, the cable wheel 5 is reversed to let off the steel cable 51, and therefore the tree stand 10 is lowered to the ground. Therefore, the invention enables one person to set up the tree stand 10 on the tree 6 from the ground safely with less labor.

Figure 6:
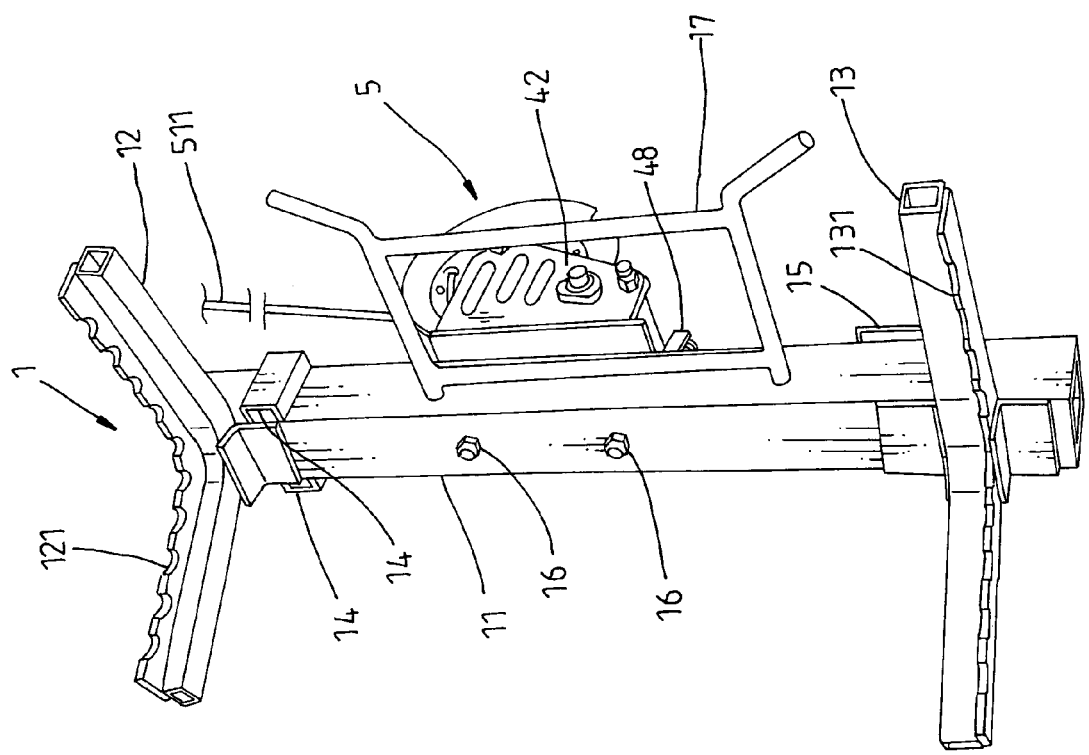
FIG. 6 is another perspective view of the tree stand hoist according to the present invention when viewed from another different angle.

Referring to FIG. 6, the horizontal stop bars 12 and 13 of the holder frame 1 each have a plurality of serrations 121 or 131 for positioning positively.

Referring to FIGS. 3 and 4, the harness 2 at the belt lug 15 is adjustable in length, having a male buckle member 21 at one end and a female buckle member 22 at the other end for receiving the male buckle member 21. Any of a variety of adjustable fastening straps may be used to substitute for the harness 2. The harness 3 at the belt lugs 14 is adjustable in length, having a hook 31 at each of the two distal ends thereof for hooking on the tree 6. Further, a reel 17 is fastened to the vertical main shaft 1 with a fastening member 171. When the tree stand hoist is not in use, the user can use the reel 17 to receive the rope 8.

Figure 7:
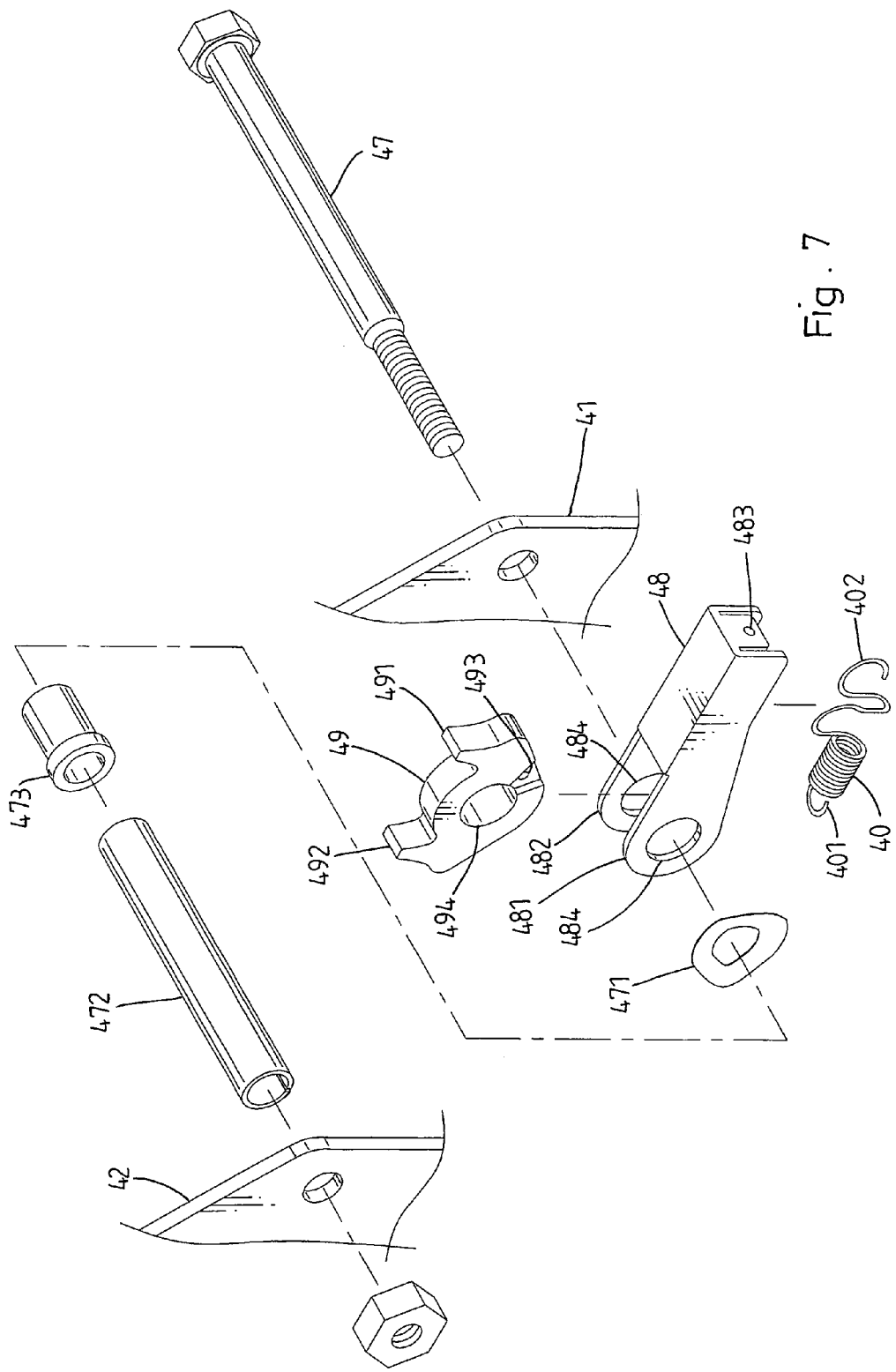
FIG. 7 is an exploded view in an enlarged scale of a part of the tree stand hoist according to the present invention.
Figure 8:
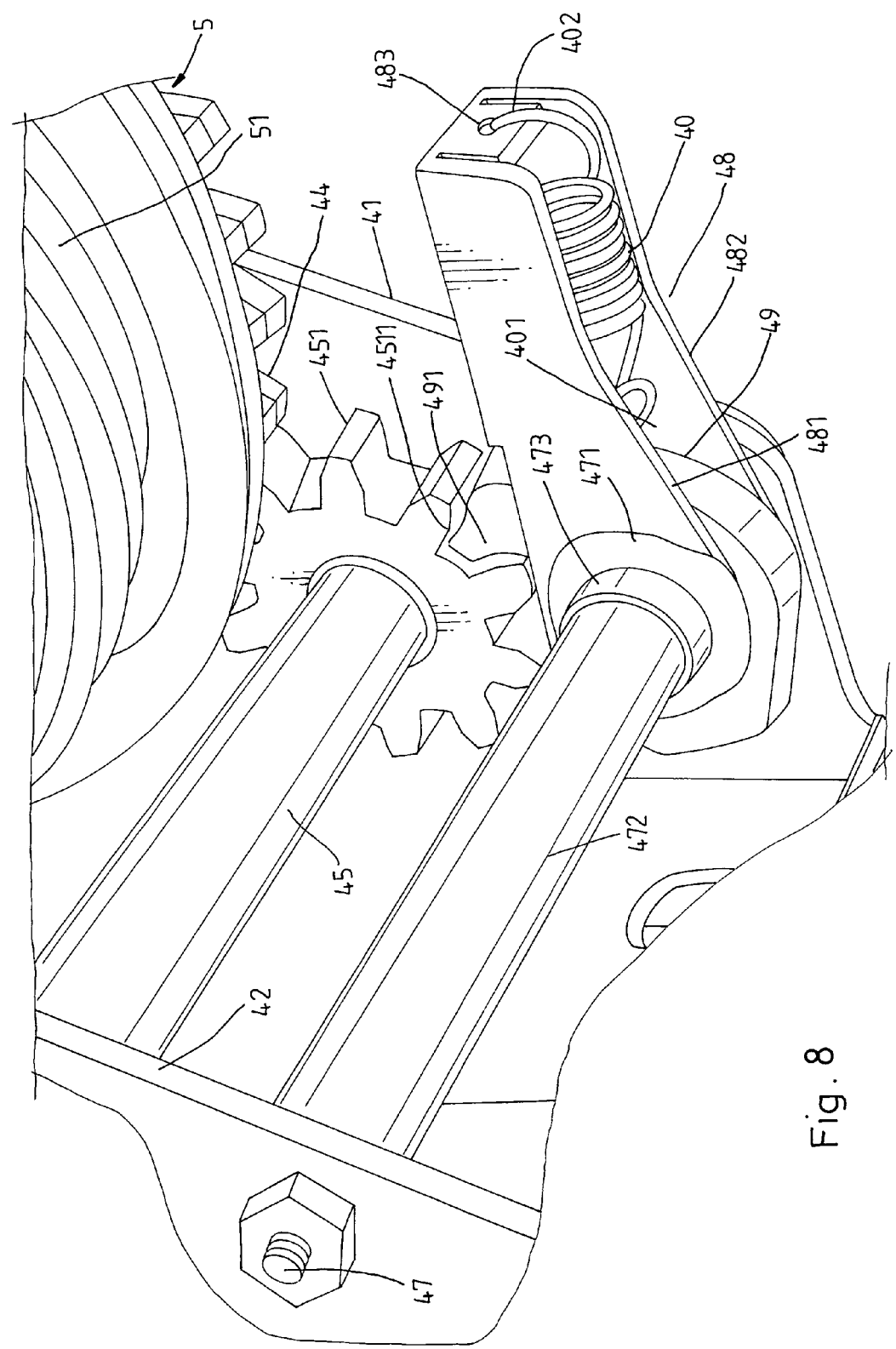
FIG. 8 is an enlarged view of a part of the tree stand hoist according to the present invention, showing the first tooth of the ratchet block meshed with the transmission gear.

Referring to FIGS. 7 and 8, a pivot bolt 47 is pivotally mounted on the parallel sidewalls 41 and 42 of the bracket 4, and inserted through the through hole 484 of each of the two parallel front lugs 481 and 482 of a control bar 48, the through hole 494 of a ratchet block 49, a spring washer 471, a sleeve 472 and a bushing 473. The ratchet block 49 is set between the two parallel front lugs 481 and 482 of the control bar 48, having a first tooth 491 and a second tooth 492 spaced from each other at an angle, and a retaining notch 493 fastened to one end 401 of a spring member 40, which has the other end 402 fastened to a rear retaining hole 483 of the control bar 48. The bushing 473 is mounted in the through holes 484 of the parallel front lugs 481 and 482 of the control bar 48. When biasing the control bar 48 upwards or downwards, the ratchet block 49 is moved to force the first tooth 491 or second tooth 492 into engagement with one tooth groove 4511 of the transmission gear 451 to further control forward or backward rotation of the transmission gear 451 (see FIGS. 8 and 9). Therefore, by means of selectively controlling the first tooth 491 or second tooth 492 of the ratchet block 49 into engagement with one tooth groove 4511 of the transmission gear 451, the cable wheel 5 is set for forward or backward rotation only, assuring operation safety.

Further, the cable pulley assembly 7 comprises a pulley bracket 71 and a pulley 72 pivotally mounted in the pulley bracket 71. One end 511 of the steel cable 5 is inserted through the gap between the pulley bracket 71 and the periphery of the pulley 72. The pulley bracket 71 has a top mounting eye 711 to which one end 81 of the rope 8 is affixed (see FIG. 2).

Referring to FIG. 4, after attachment of the horizontal stop bars 12 and 13 of the holder frame 1 to the tree 6 and after the harnesses 2 and 3 have been respectively fastened to the tree 6, the coupling tip 452 of the axle 45 is kept biased from the center line of the tree 6 at a distance so that the tree 6 is not in the way of the rotary path of the crank handle 46, i.e., rotating the crank handle 46 does not touch the tree 6.

As indicated above, the invention provides a tree stand hoist that has the following features:

1. The holder frame 1 of the tree stand hoist can be fastened to the trunk of a tree 6 positively, for enabling the steel cable 51 of the cable wheel 5 to extend through the cable pulley assembly 7 with the hook 50 at the end of the steel cable 51 hooked on the on one horizontal top frame bar 1011 of the top rack 101 of the tree stand 10 after one end of the rope 8 has been fastened to the cable pulley assembly 7 and the other end of the rope 8 has been extended over one branch 81 of the tree 6 and then tied up to the trunk of the tree 6, so that the user can operate the crank handle 46 to rotate the axle 45 in one direction and to further drive the transmission gear 451 to rotate the driven gear wheel 44 and the cable wheel 5 so as to roll up the steel cable 51 in lifting the tree stand 10 to the desired elevation for setting up on the tree 6.

2. The tree stand hoist of the invention uses the steel cable 50 to lift the tree stand 10 to the desired elevation. Therefore, the user can list the tree stand 10 with less effort. Because the user does not touch the tree stand 10 when lifting it, it is safe to set up the tree stand 10 on a tree.

3. By means of the tree stand hoist, the user can set up the tree stand 10 on a tree quickly with less effort.

Although a particular embodiment of the invention has been described in detail for purposes of illustration, various modifications and enhancements may be made without departing from the spirit and scope of the invention. Accordingly, the invention is not to be limited except as by the appended claims

What is claimed is:

1. A tree stand hoist comprising:
a holder frame, said holder frame comprising a vertical main shaft, a plurality of horizontal stop bars respectively and fixedly provided at a front side of said vertical main shaft near top and bottom ends of said vertical main shaft, and a plurality of belt lugs respectively provided at said vertical main shaft near said horizontal stop bars;
two harnesses respectively mounted on said belt lugs of said holder frame and adapted to fasten said holder frame to a tree;
a bracket fixedly fastened to a back side of said vertical main shaft, said bracket having two parallel sidewalls;
a cable wheel pivotally supported between the two parallel sidewalls of said bracket;
a driven gear wheel fixedly fastened to one side of said cable wheel;
a cable pulley assembly;
a rope for fastening to the trunk of a tree, said rope having one end fastened to said cable pulley assembly;
a steel cable wound round said cable wheel, said steel cable having a first end fixedly fastened to the periphery of said steel cable and a second end inserted through said cable pulley assembly and fixedly provided with a hook for hooking a tree stand;
an axle pivotally supported on the two parallel sidewalls of said bracket, said axle having a coupling tip extended from one end thereof;
a transmission gear fixedly mounted on said axle and meshed with said driven gear wheel; and
a crank handle coupled to the coupling tip of said axle for rotating said axle.

2. The tree stand hoist as claimed in claim 1, wherein said stop bars of said holder frame each have a plurality of serrations for positioning.

3. The tree stand hoist as claimed in claim 1, wherein said harnesses are respectively formed of length adjustable straps each having a male buckle member at one end thereof and a female buckle member at an opposite end thereof.

4. The tree stand hoist as claimed in claim 1, wherein said harnesses are respectively formed of length adjustable straps each having a hook at each of two distal ends thereof.

5. The tree stand joist as claimed in claim 1, further comprising a control device adapted to selectively control the direction of rotation of said cable wheel, said control device comprising pivot bolt pivotally mounted on the parallel sidewalls of said bracket, a ratchet block pivoted to said pivot bolt and adapted to control the direction of rotation of said transmission gear, said ratchet block having a first tooth for engaging said transmission gear to stop said transmission gear from clockwise rotation, a second tooth for engaging said transmission gear to stop said transmission gear from counterclockwise rotation, a through hole coupled to said pivot bolt, and a retaining notch, a control bar for controlling engagement of the first tooth and second tooth of said ratchet block with said transmission gear selectively, said control bar having a front end pivoted to said pivot bolt and a rear end, and a spring member connected between the rear end of said control bar and the retaining notch of said ratchet block, a spring washer mounted on said pivot bolt and stopped between the front end of said control bar and one sidewall of said bracket, a sleeve inserted through the front end of said control bar and said ratchet block and sleeved onto said pivot bolt between the parallel sidewalls of said bracket, and a bushing sleeved onto said sleeve and inserted into the through hole of said ratchet block and coupled to the front end of said control bar.

6. The tree stand hoist as claimed in claim 1, wherein said cable pulley assembly comprises a pulley bracket, and a pulley pivotally mounted in said pulley bracket, said pulley bracket defining with the periphery of said pulley a gap for the passing of said steel cable, said pulley bracket having a top mounting eye for the mounting of said rope.

7. The tree stand hoist as claimed in claim 1, wherein the coupling tip of said axle is disposed at such a location that when said stop bars of said holder frame are attached to a tree and said harnesses are fastened to the tree, the tree does not interfere with operation of said crank handle to rotate said axle.

* * * * *